United States Patent
Mitsyanko et al.

(10) Patent No.: US 12,216,608 B2
(45) Date of Patent: Feb. 4, 2025

(54) AUTHENTICATED CONTROL SEQUENCES TO INITIALIZE SENSORS OVER A MULTI-TARGET INTERFACE BUS

(71) Applicant: NVIDIA Corporation, Santa Clara, CA (US)

(72) Inventors: Igor Mitsyanko, San Carlos, CA (US); Aki Petteri Niemi, Vancouver (CA); Junghyun Kim, Dublin, CA (US)

(73) Assignee: NVIDIA Corporation, Santa Clara, CA (US)

( * ) Notice: Subject to any disclaimer, the term of this patent is extended or adjusted under 35 U.S.C. 154(b) by 50 days.

(21) Appl. No.: 18/174,029

(22) Filed: Feb. 24, 2023

(65) Prior Publication Data

US 2024/0289296 A1 Aug. 29, 2024

(51) Int. Cl.
*G06F 13/42* (2006.01)
*G06F 13/16* (2006.01)

(52) U.S. Cl.
CPC ...... *G06F 13/4282* (2013.01); *G06F 13/1673* (2013.01)

(58) Field of Classification Search
CPC .................. G06F 13/4282; G06F 13/1673
See application file for complete search history.

(56) References Cited

U.S. PATENT DOCUMENTS

| | | | | |
|---|---|---|---|---|
| 2005/0288799 A1* | 12/2005 | Brewer | ................ | H05K 7/1472 361/679.02 |
| 2013/0179687 A1* | 7/2013 | Falk | ........................ | G06F 21/44 713/168 |
| 2017/0126402 A1* | 5/2017 | Medvinsky | ........... | H04L 9/0866 |
| 2018/0279111 A1* | 9/2018 | Stamatakis | ......... | H04W 40/248 |
| 2022/0353649 A1* | 11/2022 | Stitt | ........................ | H04W 4/70 |
| 2023/0069909 A1* | 3/2023 | Park | ..................... | G01R 31/382 |

* cited by examiner

*Primary Examiner* — Henry Tsai
*Assistant Examiner* — Harry Z Wang
(74) *Attorney, Agent, or Firm* — Lowenstein Sandler LLP

(57) ABSTRACT

A controller device includes a memory storing instructions. An interface bus is coupled to sensors and configured to operate with a multi-target interface protocol. A processor is coupled to the memory and the interface bus. The processor broadcasts initialization data, according to the multi-target interface protocol, to the sensors. The processor generates, from the initialization data, using at least one cryptographic function, an authentication tag for each sensor. Each authentication tag is specific to a corresponding sensor of the sensors. The processor also unicasts, according to the multi-target interface protocol, each authentication tag to the corresponding sensor of the sensors.

20 Claims, 5 Drawing Sheets

AUTHENTICATED CONTROL SEQUENCES TO INITIALIZE SENSORS OVER A MULTI-TARGET INTERFACE BUS

TECHNICAL FIELD

At least one embodiment pertains to processing resources used to control same-type sensors. For example, at least one embodiment pertains to technology for authenticated control sequences to initialize sensors over a multi-target interface bus.

BACKGROUND

Sensors are becoming ubiquitous in many industries, including automotive (e.g., vehicular), manufacturing, aerospace, food service, and many others. In some of these applications, sensors of the same type are duplicated to cover a large area sufficient to perform a particular sensing function. As just one example, for purposes of explanation, many vehicles are now engineered with multiple cameras (or other types of image sensors) covering overlapping sectors around a chassis of a vehicle, enabling sensing other vehicles and objects moving into the space surrounding the vehicle. A controller coupled to the sensors can detect such movement and warn an operator and/or operate the vehicle to avoid such vehicles and objects.

In many sensor applications, the controller takes a long time to initialize each camera and each other sensor with initialization data. As the number of sensors grows, the delay can be unacceptable from the time of powering on a vehicle until the vehicle is fully operational. Thus, sensors, such as these cameras, can be currently initialized if the sensors are of the same type and are to be configured the same, e.g., with a matching configuration. This concurrent initialization may be performed over a common bus, for example, via a broadcast operation from the controller. A challenge arises, however, in that industry organizations require the initialization data to be authenticated to avoid a hacker from taking control of the sensors and being able to effectively control the vehicle as well. This is because the controller needs to generate an authentication tag for each separate sensor to separately authenticate each sensor, which is performed with a unicast operation. Thus, the authentication requirement forces operation back towards a unicast approach, which is slow due to initializing and authenticating each sensor separately until all sensors are authenticated and operational, even if of the same type.

BRIEF DESCRIPTION OF DRAWINGS

Various embodiments in accordance with the present disclosure will be described with reference to the drawings, in which.

DETAILED DESCRIPTION

Figure 1:
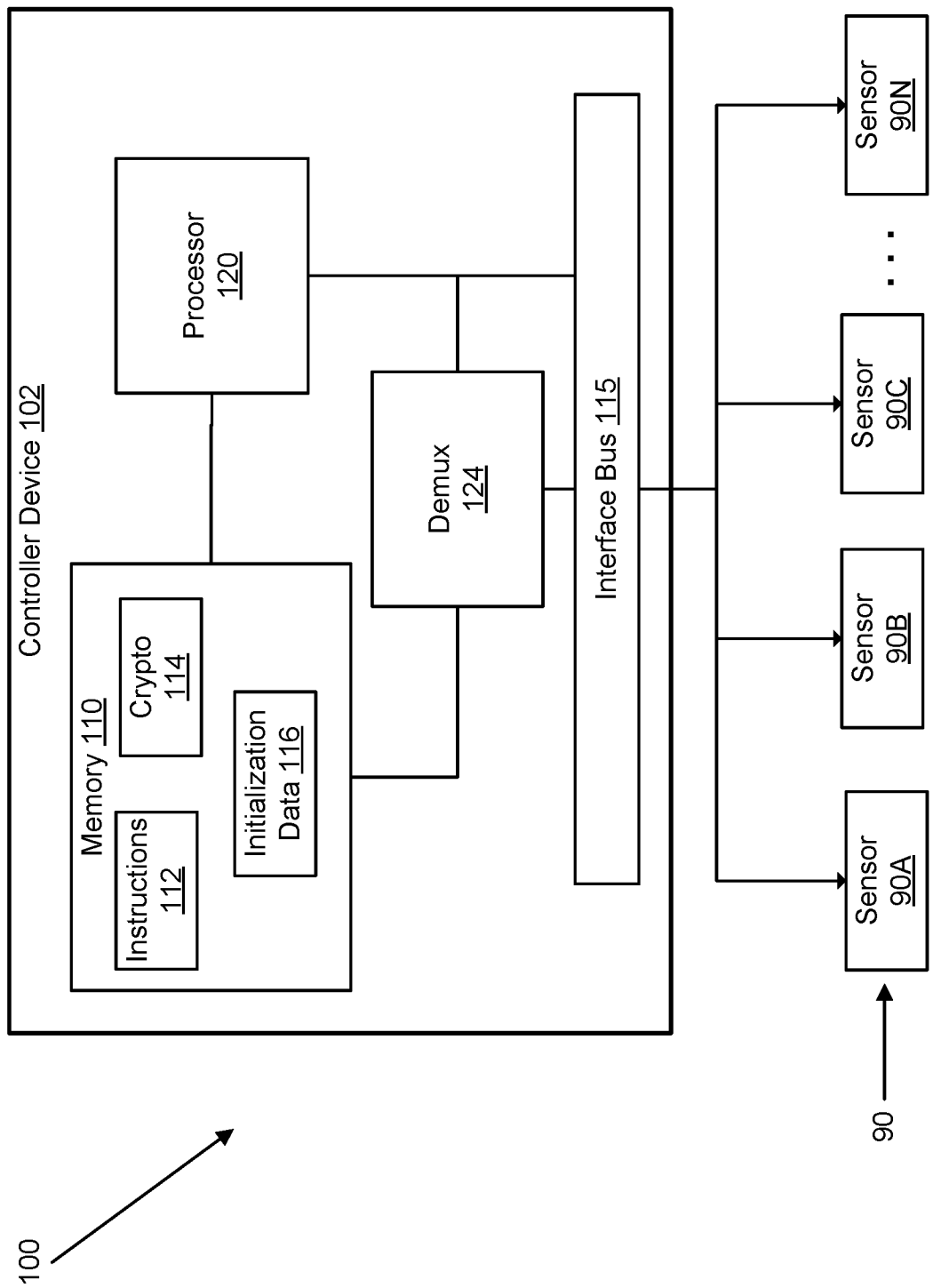
FIG. 1 is a schematic block diagram of a system having a controller device that securely initializes and controls sensors, in accordance with at least some embodiments.

In some sensor-based applications, a controller device (e.g., a processing device) initializes the sensors by broadcasting initialization data to the sensors, e.g., which may be performed upon power up of an autonomous system or placing such a system into standby or a sleep mode. The broadcasting can be performed, for example, over a bus configured with a multi-target interface protocol. In some cases, as an example, the multi-target interface protocol is Inter-Integrated Circuit Communication Protocol (I2C) or other synchronous, multi-controller/multi-target, packet-switched, serial communication bus protocol. Using the multi-target interface protocol, the controller device can write to the same address of each sensor to initialize each sensor of the same type, which is configured to use the same address for broadcasting.

In various embodiments, the initialization can involve a sequence of register writes to registers of the sensors, which programs the sensors for operation. The initialization, for example, can involve setting parameters (e.g., frame rate of camera or image sensors) or calibration data of the sensors. Often, the initialization data is much larger than can be effectively processed and broadcast over the bus, so the initialization involves many transactions over a multi-target bus before the sensors are fully initialized and operational. For example, in many embodiments, the register writes are voluminous and non-contiguous, requiring many register writes. The register writes may be non-contiguous due to, among other reasons, performing interleaved reads or polling operations where certain data is to be read back before progressing with the register writes that configure the sensors.

The automotive and other industries now require the verification of the integrity and source of the initialization data, e.g., to prevent hackers from taking control of the operation of a vehicle (or other equipment) by virtue of controlling the initialization of the sensors on which the vehicle (or other equipment) depends for control. To perform such verification, the controller device can be configured to employ cryptographic authentication, e.g., process the initialization data (sometimes chunks at a time) through a cryptographic function that generates an authentication tag. The sensors are also configured to perform the same cryptographic function on the received initialization data, also generating a related authentication tag. Upon comparing the related authentication tag with the authentication tag (e.g., verifying that they match), each respective sensor can verify the integrity of the initialization data and acknowledge as much to the controller. Because a unique cryptographic key is employed with each respective sensor, the authentication process is inherently a serial operation performed by generating and unicasting each unique authentication tag to its respective sensor. As mentioned, this requirement forces operation back towards a unicast approach, which is slow due to initializing and authenticating each sensor separately, until all sensors are authenticated and operational, even if of the same type.

Aspects and embodiments of the present disclosure address the above-mentioned deficiencies with employing a unicast approach to initialization of multiple sensors due to the regulatory requirement of security conflicting with broadcasting the initialization data. In embodiments, the above-noted deficiencies are addressed by interleaving a combination of broadcasting the initialization data with unicasting authentication data/information that the sensors can use to verify the integrity of the initialization data.

More specifically, in at least some embodiments, a controller device includes or is coupled to a memory storing instructions. The controller device also includes an interface bus coupled to a plurality of sensors and is configured to operate with a multi-target interface protocol. In embodiments, the sensors are of the same type, e.g., all camera or image sensors, all motion sensors, or the like, and thus can be configured and calibrated the same. A processor is coupled to the memory and the interface bus. In embodiments, the processor executes the instructions to perform operations such as broadcasting initialization data, according to the multi-target interface protocol, to the plurality of sensors. In these embodiments, the operations also include generating, from the initialization data, using at least one cryptographic function, an authentication tag for each sensor of the plurality of sensors. In embodiments, each authentication tag is specific (or unique) to a corresponding sensor. In these embodiments, the operations also include unicasting, according to the multi-target interface protocol, each authentication tag to the corresponding sensor of the plurality of sensors.

Therefore, advantages of the systems and methods implemented in accordance with some embodiments of the present disclosure include, but are not limited to, the combination of the performance of system initialization benefiting from the broadcasting of initialization data while complying with regulatory requirements of authenticating the initialization data. Other advantages will be apparent to those skilled in the art of sensor-based control in autonomous (or at least partially automated) systems discussed hereinafter.

FIG. 1 is a schematic block diagram of a system 100 having a controller device 102 that securely initializes and controls sensors, in accordance with at least some embodiments. For example, in some embodiments, the system 100 includes multiple sensors 90 coupled to the controller device 102 via an interface bus 115. The multiple sensors 90 may include a first sensor 90A, a second sensor 90B, a third sensor 90C, and so forth up to an Nth sensor 90N. The multiple sensors 90 may be the same type of sensor in the sense that all of the multiple sensors 90 can be configured with the same initialization data. Thus, while the system 100 may include other different sensors (see FIG. 2), this disclosure is more particularly directed to the configuration and control of multiple sensors of the same type (see FIG. 3).

In at least some embodiments, the controller device 102 includes a memory 110, a demultiplexer 124, optionally includes (or is coupled to) the interface bus 115, and includes a processor 120 coupled to the interface bus 115 and the memory 110. In embodiments, the memory 110 stores instructions 112 (or other software code), cryptographic data 114 (or crypto-related information) such as cryptographic functions, algorithms, secret and/or public keys, and the like, and initialization data 116. The initialization data 116 may include parameters (e.g., frame rate of cameras) or calibration data that is to be programmed into registers of the sensors 90 for operation of the multiple sensors 90. The cryptographic data 114 may support and be related to key-based cryptography, and will be discussed in more detail. In embodiments, the memory 110 is a computer-readable storage medium storing instructions 112 which, when executed by the processor 120, cause the processor 120 to perform particular operations described herein in detail.

In various embodiments, the interface bus 115 is either included within the controller device 102 or is located outside of the controller device 102 and still coupled between the controller device 102 and the multiple sensors 90. In embodiments, the interface bus 115 is configured with a multi-target interface protocol. In some cases, the multi-target interface protocol is Inter-Integrated Circuit (I2C or I²C) or other synchronous, multi-controller/multi-target, packet-switched, single-ended, serial communication bus protocol. Other examples of the multi-target interface protocol include Serial Peripheral Interface (SPI), Universal Serial Bus (USB), Controller Area Network (CAN), or Microwire communication protocols. In embodiments, the interface bus 115 is capable of arbitration according to sensor address and sending individual authentication tags (or packets) to the correct destination sensor.

In embodiments, the demultiplexer 124 is configured to support the multi-target interface protocol of the interface bus 115, e.g., helps identify an address (or other destination) for particular data from the controller device 102 and transmit the data to that address (or other destination). In some embodiments, the demultiplexer 124 is replaced with a deserializer, e.g., of a serializer/deserializer (SerDes), that performs a similar functionality with respect to high-speed link communication. To optimize initialization in such controller and/or communication devices, for example, the demultiplexer 124 (or deserializer) can support a special broadcast mode of the multi-target interface protocol, where a single write operation is fanned out by the demultiplexer 124 (or deserializer) to each connected sensor module. The demultiplexer 124 (or deserializer) then collects acknowledgments (ACKs) or non-acknowledgments (NACKs) and provides them in a single ACK/NACK to the processor 120. This allows fully parallelizing the sensor initialization sequence when using the same initialization data 116.

Figure 2:
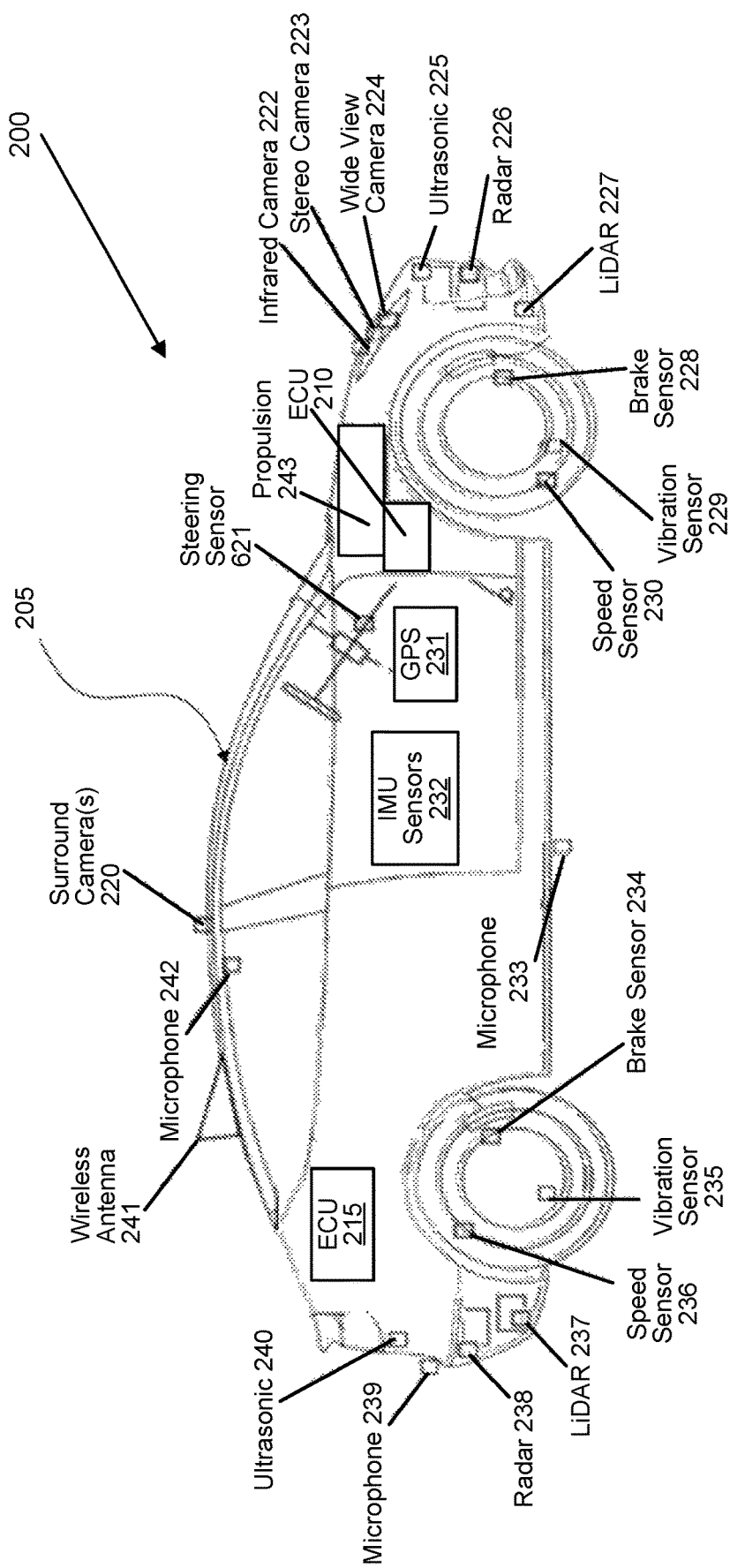
FIG. 2 is a diagram of an example autonomous vehicle system demonstrating potential placement of sensors and controllers, in accordance with at least some embodiments.

FIG. 2 is a diagram of an example autonomous vehicle system 200 demonstrating potential placement of sensors and controllers, in accordance with at least some embodiments. A vehicle 205 in the example of FIG. 2 includes a passenger vehicle such as a car or truck that can accommodate a human driver and/or human passengers. One or more controllers 210 and 215, such as embedded control units (ECUs), provide autonomous self-driving capabilities in response to signals continuously provided in real-time from an array of sensors, as described more fully below.

In various embodiments, each controller 210 and 215 operates in real-time to process sensor signals and output autonomous operation commands to the vehicle 205 and/or assist the human vehicle driver in driving. Each vehicle 205 can have various numbers of distinct controllers for functional safety and additional features. The controllers 210 and 215, or other controllers, typically send signals via the interface bus 115 and/or a CAN bus, a network inside modern cars used to control brakes, acceleration, steering, windshield wipers, etc. The CAN bus can be configured to have dozens of nodes, each with its own unique identifier (CAN ID). Other protocols can be used for communicating within a vehicle, including FlexRay® protocol and Ethernet. In some embodiments, the interface bus 115 is integrated with or coupled to a CAN bus in order to control sensors of the same type.

In at least some embodiments, the controllers 210 and 215 provide autonomous driving outputs in response to an array of sensor inputs including, for example: one or more ultrasonic sensors 225 and 240, one or more radar sensors 226 and 238, one or more light and ranging (LIDAR) sensors 227 and 237, one or more surround cameras 220 (e.g., image sensors), one or more stereo cameras 223 (in preferred embodiments, at least one such stereo camera faces forward to provide depth-perception for object detection and object recognition in the vehicle path), one or more infrared cameras 222, one or more wide view or fisheye cameras 224, global positioning system (GPS) unit 231 that provides location coordinates, a steering sensor 221 that detects the steering angle, speed sensors 230 and 236 (one for each of the wheels), a brake sensor 228 and 234 (one for each of the wheels), an internal measurement unit (IMU) 232 that monitors movement of vehicle body (this sensor can be, for example, one or more accelerometers and/or a gyrosensors and/or magnetic compasses), tire vibration sensors 229 and 235 (one for each of the wheels), and microphones 233, 239, and 242 placed around and inside the vehicle. Other sensors can monitor the propulsion system 243 and receive data from wireless antenna 241, for example, weather information or traffic conditions. Other sensors can be used, as would be apparent to persons of ordinary skill in the art.

According to one or more embodiments, the vehicle 205 includes a plurality of cameras 220, 222, 223, and 224 (e.g., camera or image sensors), capturing images around the entire periphery of the vehicle 205. Camera type and lens selection depend on the nature and type of function. The vehicle 205 can have a mix of camera types and lenses to provide complete coverage around the vehicle 205. In one or more embodiments, the vehicle 205 includes twelve cameras, although a greater or lesser number may be used. In embodiments, camera locations on the vehicle 205 support low voltage differential signaling (LVDS)-based and/or Gigabit Ethernet (GbE)-based technologies. In some embodiments, the networked sensors use the Mobile Industry Processor Interface (MIPI) Camera Serial Interface (CSI-2) protocol (or other version), which is a widely adopted, high-speed protocol for transmission of still and video images from image sensor to application processors. Such image processor can be a system on a chip (SoC) such as the NVIDIA® Tegra. Further, vehicular applications also employ Gigabit Multimedia Serial Links (GMSL) and/or Flat Panel Display Link (e.g., FPDLink III or other version) in SerDes configurations. Other protocols, now employed or later adopted are also envisioned.

Figure 3:
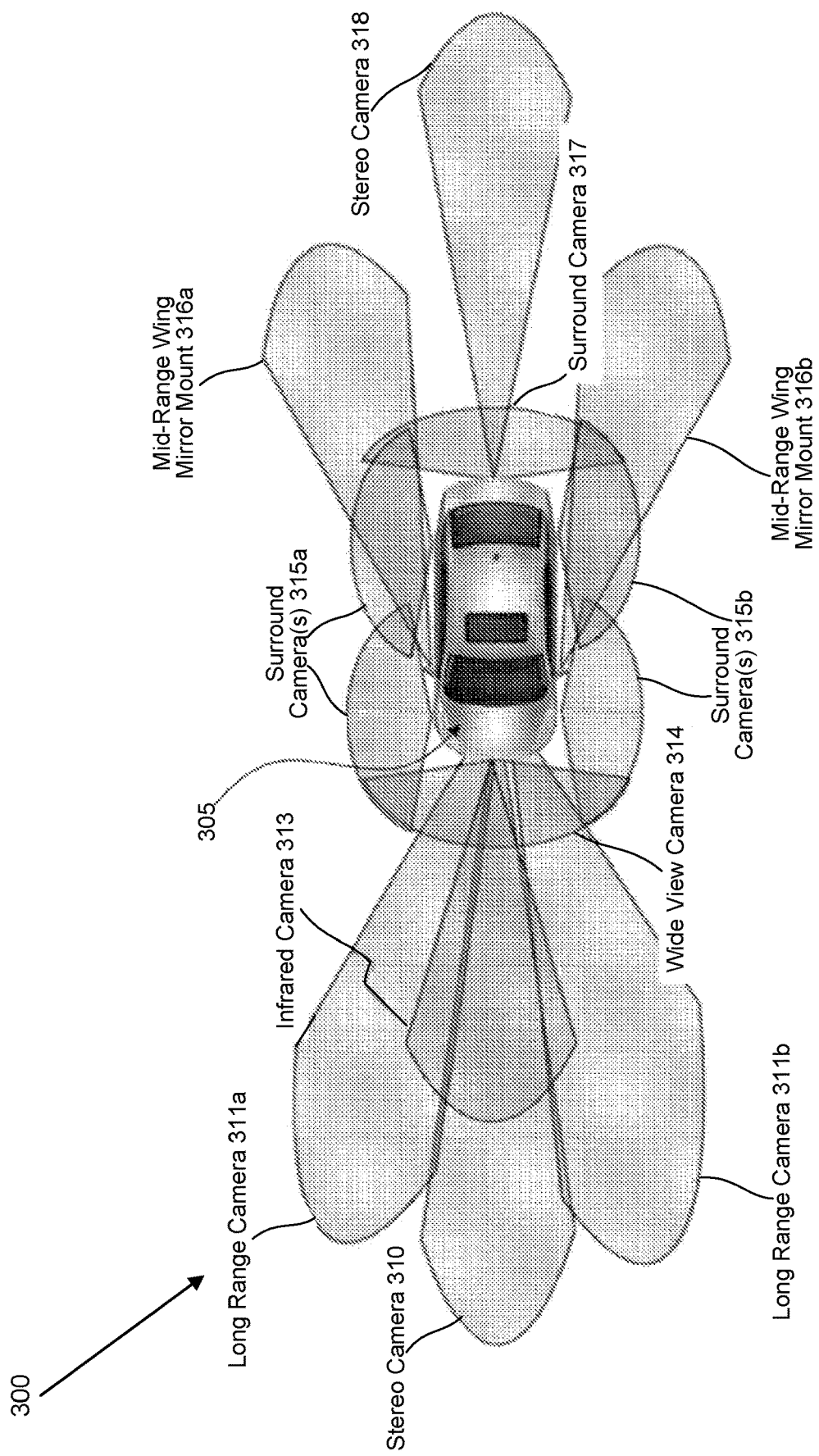
FIG. 3 is a diagram of an example camera system of a vehicle, in accordance with at least some embodiments.

FIG. 3 is a diagram of an example camera system 300 of a vehicle 305, in accordance with at least some embodiments. In some embodiments, the vehicle 305 is the same as the vehicle 205. In some embodiments, the system 100 of FIG. 1 is integrated in either of the systems 200 or 300. The camera system 300 demonstrates one example of camera types and locations, with twelve cameras (e.g., camera sensors), including a front stereo camera 310, long-range cameras 311a and 311b, a front wide-view camera 314, surround cameras 315a and 315b, mid-range wing mirror mount cameras 316a and 316b, a rear surround camera 317, a rear stereo camera 318, and an infrared camera 313. Although each camera zone of coverage is being labeled, this is for purposes of explanation, and it should be understood that each camera is physically located within or on the vehicle 305 and is generally oriented towards its respective zone of coverage.

In embodiments, cameras record and provide video information simultaneously. The vehicle 305 may include one or more LIDAR sensors as well, although not specifically illustrated. In at least one example, multiples of the illustrated cameras and of these LIDAR sensors are considered the same type of sensor for purposes of the present disclosure.

The vehicle 305 can have two ECUs (e.g., controllers 210 and 215 of the vehicle 205). One ECU can receive sensor data, for example, from cameras 310, 311a, 3116, 313, 314, and 315a. The second ECU can receive sensor data, for example, from cameras 315b, 316a, 316b, 317, and 318. This setup can lead to the shortest distance between the cameras and the respective ECU. The ECUs can include a converter, repeater, serial/deserializer (SerDes), and/or multiplexer/demultiplexer components to be able to forward camera sensor data received at one ECU to another ECU.

One ECU can be designated as the primary ECU and be primarily responsible for controlling the vehicle 305. The other ECU can be designated as the backup ECU and take over primary responsibility upon a failure condition occurring in the primary ECU. This can provide the redundancy and component failure support required to meet the safety and control requirements. Other combinations are possible, such as having more than two ECUs with the cameras distributed evenly or having the camera sensor data distributed differently to each of the ECUs. The processor 120 (e.g., processing device) of FIG. 1 may represent any of the ECUs, or other controllers illustrated or discussed with reference to FIGS. 2-3.

Figure 4:
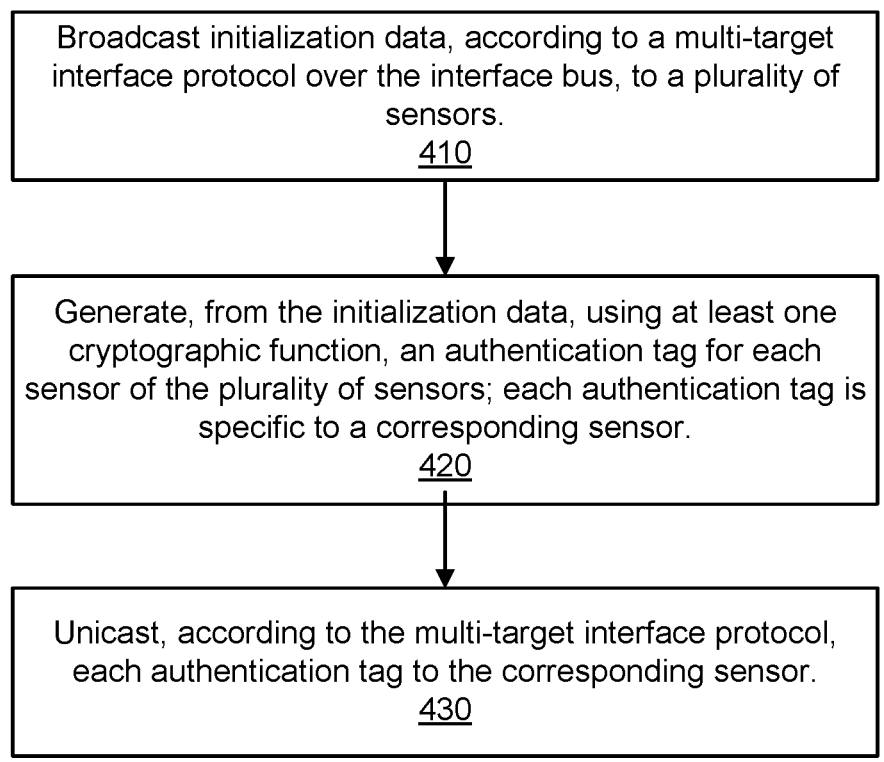
FIG. 4 is a flow diagram of a method for authenticated control sequences to initialize sensors over a multi-target interface bus, in accordance with at least some embodiments.

FIG. 4 is a flow diagram of a method 400 for authenticated control sequences to initialize sensors over a multi-target interface bus, in accordance with at least some embodiments. The method 400 can be performed by processing logic comprising hardware, software, firmware, or any combination thereof. For example, the method 400 can be performed by the controller device 102 with particular emphasis on functionality of the processor 120, also referred to herein as a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic broadcasts initialization data, according to a multi-target interface protocol over the interface bus, to a plurality of sensors, e.g., the multiple sensors 90. In embodiments, the multi-target interface protocol is one of Inter-Integrated Circuit (I2C), Serial Peripheral Interface (SPI), Universal Serial Bus (USB), or Controller Area Network (CAN) communication protocols.

At operation 420, the processing logic generates, from the initialization data, using at least one cryptographic function, an authentication tag for each sensor of the plurality of sensors. In embodiments, each authentication tag is specific to a corresponding sensor of the plurality of sensors. For example, generating the authentication tag can include employing a first cryptographic key associated with a first sensor of the plurality of sensors and employing a second cryptographic key associated with a second sensor of the plurality of sensors, the first cryptographic key being different than the second cryptographic key.

At operation 430, the processing logic unicasts, according to the multi-target interface protocol, each authentication tag to the corresponding sensor of the plurality of sensors. The sensors can then use the authentication tag to authenticate/verify the validity of the initialization data and send an acknowledgment back to the processing logic.

Figure 5:
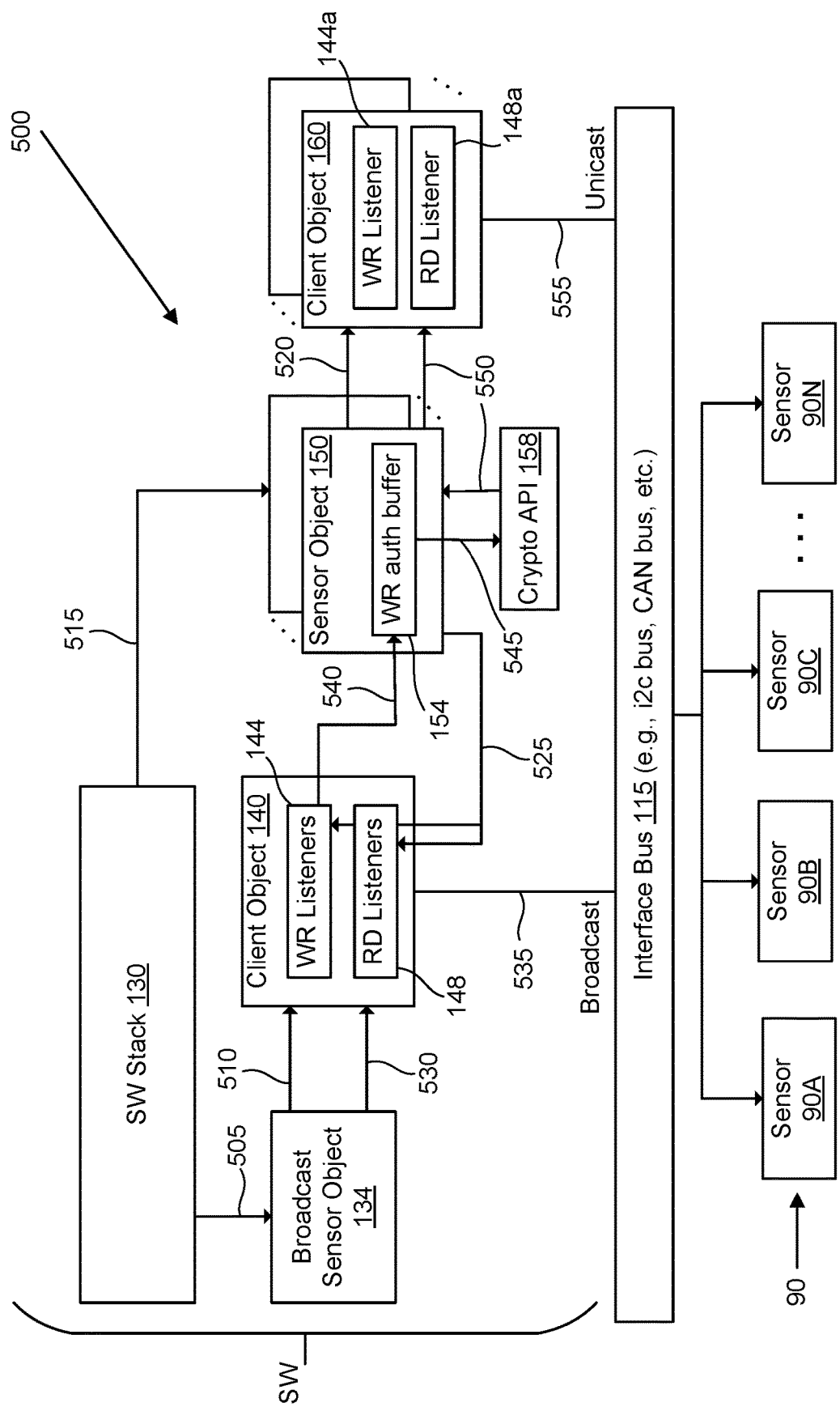
FIG. 5 is an operational flow diagram of a more-detailed method for authenticated control sequences to initialize sensors over a multi-target interface bus, in accordance with at least some embodiments.

FIG. 5 is an operational flow diagram of a more-detailed method 500 for authenticated control sequences to initialize sensors over a multi-target interface bus, in accordance with at least some embodiments. The method 500 can be performed by processing logic comprising hardware, software, firmware, or any combination thereof. For example, the method 500 can be performed by the controller device 102 (FIG. 1) with particular emphasis on functionality of the processor 120 executing instructions or software code to perform the operations of the method 500. In at least some embodiments, the processor 120 of FIG. 1 executes the instructions 112, which can be understood as running software (SW) and/or firmware (FW) on the controller device 102. In embodiments, this software runs via a software stack 130 that creates software objects discussed herein below. The processing logic may also instantiate or execute instructions related to a cryptographic application programming interface (API) 158.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic creates a sensor object 134 associated with the broadcasting (e.g., a broadcast sensor object).

At operation 510, the processing logic creates, using the sensor object 134, a client object 140 configured to broadcast the initialization data to the multiple sensors 90 across the interface bus 115. In embodiments, the client object 140 includes one or more write listeners 144, each which monitors for and detects broadcast transactions, e.g., each broadcast transaction directed to the multiple sensors 90 and associated with the initialization data. In embodiments, the client object includes one or more read listeners 148, each which monitors for and detects any transactions received from the multiple sensors 90. These listeners may be registered with the client object 140 and perform the monitoring and detection on behalf of other software objects, which will be discussed in more detail with reference to operation 525.

At operation 515, the processing logic creates a plurality of sensor objects 150 corresponding to respective sensors of the plurality of sensors. In embodiments, each sensor object 150 is associated with a write authentication buffer 154 to store the initialization data. These write authentication buffers 154 may be located within a reserved portion of the memory 110 (FIG. 1), for example, accessible by the processing logic. In embodiments, each sensor object 150 represents a corresponding physical sensor in configuration and calibration, for example, among other parameters.

At operation 520, the processing logic creates, using the plurality of sensor objects 150, a plurality of (corresponding) client objects 160 configured to unicast each authentication tag to the corresponding sensor of the plurality of sensors based on a specific address generated according to the multi-target interface protocol. Creation of each client object 160 may include creation of a write listener 144a and a read listener 148a that also monitors for transactions performed over the interface bus 115.

At operation 525, the processing logic, e.g., each respective sensor object 150, registers a corresponding write listener 144a with an original client object (e.g., the client object 140) configured to broadcast the initialization data to the multiple sensors 90. The processing logic, at operation 525, may also register the read listener 148a with the client object 140. In this way, each respective write listener 144a and each respective read listener 148a is registered to be a part of the write listeners 144 and the read listeners 148, respectively, of the client object 140. Thus, each respective write listener 144a and each respective read listener 148a can be informed of an interface transaction that is detected (whether a write transaction or a read transaction) being performed by the client object 140 on behalf of the sensor object 134, e.g., over the interface bus 115.

At operation 530, the processing logic, using the sensor object 134, commands (or otherwise causes) the client object 140 to perform a register write of the multiple sensors 90.

At operation 535, the processing logic, using the client object 140, broadcasts a write transaction with initialization data, according to the multi-target interface protocol, to the multiple sensors 90.

At operation 540, the processing logic, using the client object 140, notifies the sensor object 150 of the initialization data associated with the broadcast transaction. For example, the processing logic can store the initialization data into the write authentication buffer 154.

At operation 545, the processing logic, using the sensor object 150, provides the initialization data to the cryptographic API 158. The cryptographic API 158 generates an authentication tag, based on (e.g., using) the initialization data, for each sensor 90A-90N of the multiple sensors 90. In embodiments, each respective authentication tag is generated using a cryptographic key specific to each respective sensor of the multiple sensors 90. In various embodiments, the cryptographic API 158 is configured with a block cipher-based message authentication code algorithm (CMAC), a Galois message authentication code (GMAC), or other MAC that employs each respective cryptographic key to generate a corresponding authentication tag, e.g., a unique MAC tag for each sensor.

At operation 550, the processing logic, using the sensor object 150, sends each respective authentication tag to a corresponding client object 160 of the plurality of client objects, in preparation to be unicasted to a corresponding sensor.

At operation 555, the processing logic serially, using each respective client object 160 of the plurality of client objects, sends a corresponding authentication tag for its dedicated sensor to the corresponding sensor of the multiple sensors 90.

In at least some embodiments, the method 500 is repeated for another set of sensors or to continue initializing the same set of multiple sensors, e.g., where the initialization data is larger than the capacity of the write authentication buffer 154. For example, in various embodiments, to authenticate all of the initialization data 116, tens, hundreds, or even thousands of register writes may be required at the multiple sensors 90. Thus, the method 500 can be iterated many times, interleaving broadcasting the initialization data with unicasting corresponding authentication tags.

In these embodiments, for example, the initialization data is first initialization data that matches a capacity of each write authentication buffer 154 of respective sensor objects 150. Thus, in embodiments, the processing logic further detects each write authentication buffer 154 is at capacity and receives acknowledgments from the multiple sensors 90 that the first initialization data has been authenticated. The processing logic can further clear (e.g., flush) each write authentication buffer 154 of the first initialization data. The processing logic can further buffer second initialization data in the write authentication buffer that has been broadcasted to the plurality of sensors, and repeat the operations explained with reference to the operations of method 500 to perform another iteration of authentication and registering writing.

In at least some embodiments, the method 500 is repeated for another set of sensors or to continue initializing the same set of multiple sensors, e.g., where the initialization data is larger than the capacity of the write authentication buffer 154. In these embodiments, the initialization data is first initialization data. Thus, in embodiments, the processing logic broadcasts second initialization data that follows the first initialization data, according to the multi-target interface protocol, to the multiple sensors 90. The processing logic further generates, from the second initialization data, using the at least one cryptographic function, a second authentication tag for each sensor of the multiple sensors 90. In embodiments, each second authentication tag is specific to a corresponding sensor of the multiple sensors 90. In embodiments, the processing logic unicasts, according to the multi-target interface protocol, each second authentication tag to the corresponding sensor of the multiple sensors 90. In at least some embodiments, the maximum size of each write authentication buffer 154 is dictated by sensor capability and thus may vary for some sensors compared to other sensors.

With additional reference to FIG. 1 and FIG. 5, in various embodiments, each sensor 90A-90N buffers received initialization data (which was broadcasted by the client object 140) while waiting for the expected authentication tag (which was unicasted by the client object 160). Thus, the fact that the initialization data was broadcasted while the authentication tag unicasted are unknown (e.g., transparent) to each sensor 90. Once received, each sensor 90 can generate a second authenticated tag to compare with the unicasted authentication tag to verify the integrity of the initialization data. If verified, each sensor can respond with an acknowledgment (ACK), else the sensor responds with a non-acknowledgment (NACK), e.g., a binary indication, either of which is received by the read listeners 148a/148 and can be reported to the sensor object 134.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A controller device comprising:
a memory storing instructions;
an interface bus coupled to a plurality of sensors and configured to operate with a multi-target interface protocol; and
a processor coupled to the memory and the interface bus, the processor to execute the instructions to perform operations comprising:
creating a broadcast sensor object;
creating a broadcast client object using the broadcast sensor object;
broadcasting initialization data, according to the multi-target interface protocol and using the broadcast client object, to the plurality of sensors;
generating, from the initialization data, using at least one cryptographic function, an authentication tag for each sensor of the plurality of sensors, wherein each authentication tag is specific to a corresponding sensor of the plurality of sensors; and
unicasting, according to the multi-target interface protocol, each authentication tag to the corresponding sensor of the plurality of sensors.

2. The controller device of claim 1, wherein the multi-target interface protocol is one of Inter-Integrated Circuit (I2C), Serial Peripheral Interface (SPI), Universal Serial Bus (USB), or Controller Area Network (CAN) communication protocol.

3. The controller device of claim 1, further comprising a demultiplexer coupled to the interface bus and the processor, the demultiplexer configured to support the multi-target interface protocol.

4. The controller device of claim 1, wherein generating each authentication tag further comprises:

employing a first cryptographic key associated with a first sensor of the plurality of sensors; and employing a second cryptographic key associated with a second sensor of the plurality of sensors, the first cryptographic key being different than the second cryptographic key.

5. The controller device of claim 1, wherein the operations further comprise:

registering one or more write listeners, of the broadcast client object, to monitor for and detect broadcast transactions directed at the plurality of sensors; and registering one or more read listeners, of the broadcast client object, to monitor for and detect memory transactions received from the plurality of sensors.

6. The controller device of claim 1, wherein the operations further comprise:

creating a plurality of sensor objects corresponding to respective sensors of the plurality of sensors, each sensor object associated with a write authentication buffer to store the initialization data; and creating, using the plurality of sensor objects, a plurality of client objects configured to unicast each authentication tag to the corresponding sensor of the plurality of sensors based on a specific address generated according to the multi-target interface protocol.

7. The controller device of claim 6, wherein each client object of the plurality of client objects comprises a write listener that detects broadcast transactions associated with the initialization data, and wherein the operations further comprise registering, by each respective sensor object, a corresponding write listener with an original client object that is configured to broadcast the initialization data to the plurality of sensors.

8. The controller device of claim 6, wherein the initialization data is first initialization data that matches a capacity of each write authentication buffer, and wherein the operations further comprise:

detecting each write authentication buffer is at capacity;
receiving acknowledgments from the plurality of sensors that the first initialization data has been authenticated;
clearing each write authentication buffer of the first initialization data; and
buffering second initialization data in each write authentication buffer broadcasted to the plurality of sensors.

9. The controller device of claim 1, wherein the initialization data is first initialization data, wherein the operations further comprise:

broadcasting second initialization data that follows the first initialization data, according to the multi-target interface protocol, to the plurality of sensors;

generating, from the second initialization data, using the at least one cryptographic function, a second authentication tag for each sensor of the plurality of sensors, wherein each second authentication tag is specific to a corresponding sensor of the plurality of sensors; and unicasting, according to the multi-target interface protocol, each second authentication tag to the corresponding sensor of the plurality of sensors.

10. A system comprising:
a plurality of sensors;
an interface bus coupled to the plurality of sensors and configured to operate with a multi-target interface protocol; and
a processor coupled to the interface bus, the processor to execute instructions to perform operations comprising:
creating a broadcast sensor object;
creating a broadcast client object using the broadcast sensor object;
broadcasting initialization data, according to the multi-target interface protocol and using the broadcast client object, to the plurality of sensors;
generating, from the initialization data, using at least one cryptographic function, an authentication tag for each sensor of the plurality of sensors, wherein each authentication tag is specific to a corresponding sensor of the plurality of sensors; and
unicasting, according to the multi-target interface protocol, each authentication tag to the corresponding sensor of the plurality of sensors.

11. The system of claim 10, wherein the multi-target interface protocol is one of Inter-Integrated Circuit (I2C), Serial Peripheral Interface (SPI), Universal Serial Bus (USB), or Controller Area Network (CAN) communication protocol.

12. The system of claim 10, further comprising a demultiplexer coupled to the interface bus and the processor, the demultiplexer configured to support the multi-target interface protocol.

13. The system of claim 10, wherein generating each authentication tag further comprises:

employing a first cryptographic key associated with a first sensor of the plurality of sensors; and employing a second cryptographic key associated with a second sensor of the plurality of sensors, the first cryptographic key being different than the second cryptographic key.

14. The system of claim 10, wherein the operations further comprise:

registering one or more write listeners, of the broadcast client object, to monitor for and detect broadcast transactions directed at the plurality of sensors; and registering one or more read listeners, of the broadcast client object, to monitor for and detect memory transactions received from the plurality of sensors.

15. The system of claim 10, wherein the operations further comprise:

creating a plurality of sensor objects corresponding to respective sensors of the plurality of sensors, each sensor object associated with a write authentication buffer to store the initialization data; and creating, using the plurality of sensor objects, a plurality of client objects configured to unicast each authentication tag to the corresponding sensor of the plurality of sensors based on a specific address generated according to the multi-target interface protocol.

16. The system of claim 15, wherein each client object of the plurality of client objects comprises a write listener that detects broadcast transactions associated with the initialization data, and wherein the operations further comprise registering, by each respective client object, a corresponding write listener with an original client object that is configured to broadcast the initialization data to the plurality of sensors.

17. The system of claim 15, wherein the initialization data is first initialization data that matches a capacity of each write authentication buffer, and wherein the operations further comprise:

detecting each write authentication buffer is at capacity;
receiving acknowledgments from the plurality of sensors that the first initialization data has been authenticated;
clearing each write authentication buffer of the first initialization data; and
buffering second initialization data in each write authentication buffer broadcasted to the plurality of sensors.

18. The system of claim 10, wherein the initialization data is first initialization data, wherein the operations further comprise:
- broadcasting second initialization data that follows the first initialization data, according to the multi-target interface protocol, to the plurality of sensors;
- generating, from the second initialization data, using the at least one cryptographic function, a second authentication tag for each sensor of the plurality of sensors, wherein each second authentication tag is specific to a corresponding sensor of the plurality of sensors; and
- unicasting, according to the multi-target interface protocol, each second authentication tag to the corresponding sensor of the plurality of sensors.

19. A non-transitory computer-readable storage medium storing instructions which, when executed by a processor coupled to an interface bus, cause the processor to perform operations comprising:
- creating a broadcast sensor object;
- creating a broadcast client object using the broadcast sensor object;
- broadcasting initialization data, according to a multi-target interface protocol over the interface bus and using the broadcast client object, to a plurality of sensors;
- generating, from the initialization data, using at least one cryptographic function, an authentication tag for each sensor of the plurality of sensors, wherein each authentication tag is specific to a corresponding sensor of the plurality of sensors; and
- unicasting, according to the multi-target interface protocol, each authentication tag to the corresponding sensor of the plurality of sensors.

20. The non-transitory computer-readable storage medium of claim 19, wherein the multi-target interface protocol is one of Inter-Integrated Circuit (I2C), Serial Peripheral Interface (SPI), Universal Serial Bus (USB), or Controller Area Network (CAN) communication protocol.

* * * * *